US010006333B1

(12) United States Patent
Bisaiji

(10) Patent No.: US 10,006,333 B1
(45) Date of Patent: Jun. 26, 2018

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yuki Bisaiji, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/841,525

(22) Filed: Dec. 14, 2017

(30) Foreign Application Priority Data

Dec. 22, 2016 (JP) .................................. 2016-249949

(51) Int. Cl.
*F01N 3/10* (2006.01)
*F01N 9/00* (2006.01)
*F01N 3/08* (2006.01)
*F01N 3/20* (2006.01)
*B01J 38/02* (2006.01)
*B01D 53/94* (2006.01)

(52) U.S. Cl.
CPC ........... *F01N 9/00* (2013.01); *B01D 53/9422* (2013.01); *B01D 53/9495* (2013.01); *B01J 38/02* (2013.01); *F01N 3/0814* (2013.01); *F01N 3/0842* (2013.01); *F01N 3/0864* (2013.01); *F01N 3/2006* (2013.01); *F01N 3/206* (2013.01); *B01D 2255/908* (2013.01); *F01N 2570/14* (2013.01); *F01N 2900/0422* (2013.01); *F01N 2900/0601* (2013.01); *F01N 2900/1402* (2013.01); *F01N 2900/1602* (2013.01); *F01N 2900/1624* (2013.01)

(58) Field of Classification Search
CPC ............. F02D 41/1456; F02D 41/0295; F02D 41/405; Y02A 50/248; F01N 3/2013
USPC .................................... 60/274, 299, 285, 286
See application file for complete search history.

(56) References Cited

U.S. PATENT DOCUMENTS

2007/0137180 A1* 6/2007 Matsuno ............... F01N 3/0253
60/286
2007/0193256 A1* 8/2007 Matsuno ............... F01N 3/0253
60/295

(Continued)

FOREIGN PATENT DOCUMENTS

EP         2151555 A1    2/2010
WO    2010/116535 A1    10/2010

*Primary Examiner* — Tom P Duong
(74) *Attorney, Agent, or Firm* — Oliff PLC

(57) ABSTRACT

An exhaust gas control apparatus includes a catalytic device in an exhaust passage, and the catalytic device carrying an NSR catalyst and an oxygen storage agent. A poisoning recovery control section of the catalytic device executes poisoning recovery control and includes: an oxygen storage amount estimation section that estimates an oxygen storage amount of the catalytic device; a determination section that determines timing at which an estimation value of the oxygen storage amount becomes equal to or smaller than an elimination start determination value after a start of elimination processing in the poisoning recovery control as elimination start timing; and a termination timing decision section that decides termination timing of the poisoning recovery control on the basis of a supply amount of a reducing agent to the catalytic device in a period after the elimination start timing during the elimination processing.

5 Claims, 7 Drawing Sheets

(56) References Cited

U.S. PATENT DOCUMENTS

2015/0075142 A1* 3/2015 Hashimoto ............ B01D 53/50
                                                                         60/300
2016/0208721 A1* 7/2016 Wakimoto ......... G01N 27/4074

* cited by examiner

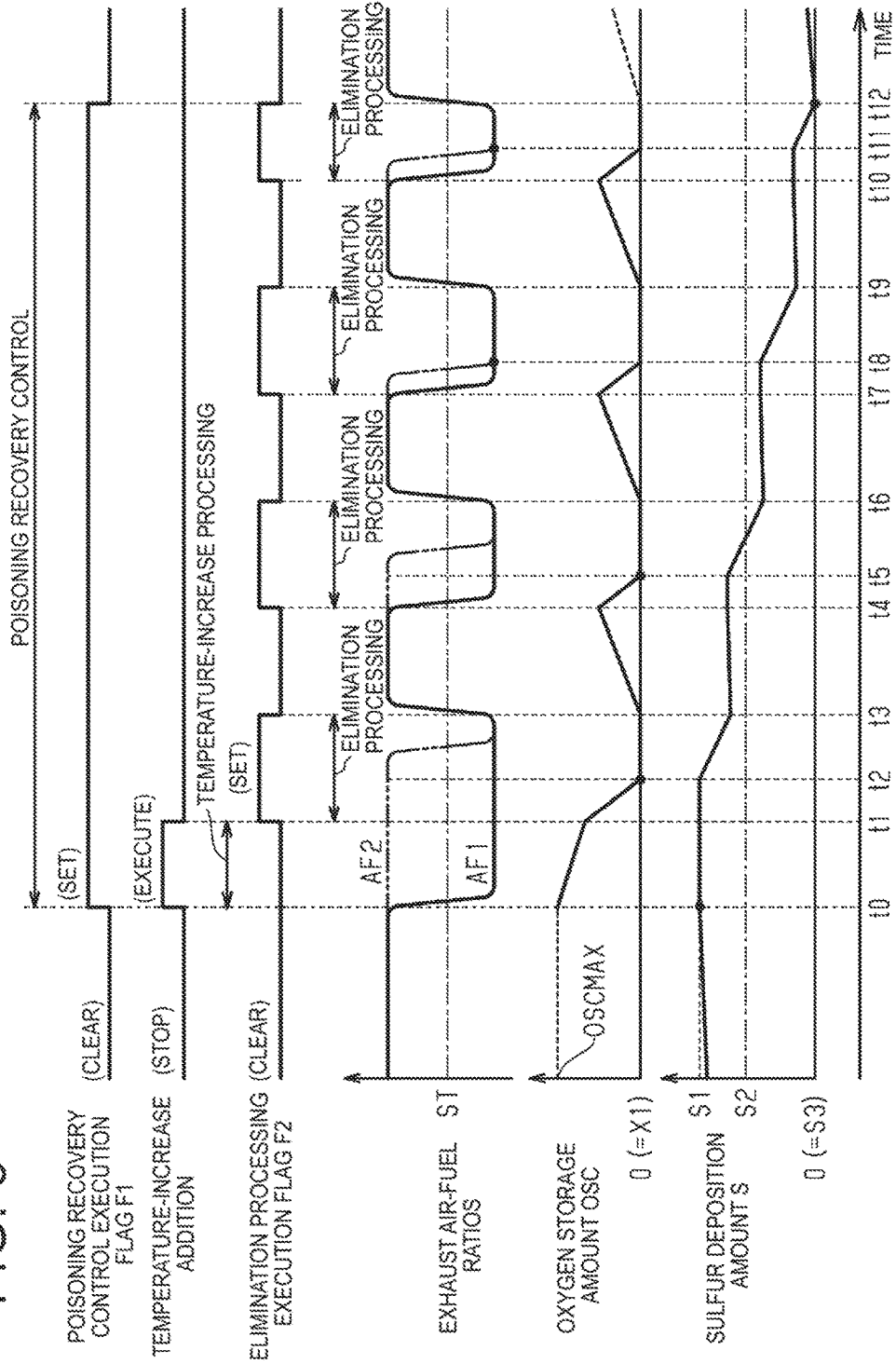

EXHAUST GAS CONTROL APPARATUS FOR INTERNAL COMBUSTION ENGINE

INCORPORATION BY REFERENCE

The disclosure of Japanese Patent Application No. 2016-249949 filed on Dec. 22, 2016 including the specification, drawings and abstract is incorporated herein by reference in its entirety.

BACKGROUND

1. Technical Field

The disclosure relates to an exhaust gas control apparatus for an internal combustion engine.

2. Description of Related Art

As an exhaust gas control apparatus for an internal combustion engine, there is an exhaust gas control apparatus that includes a catalytic device of NOx storage-reduction type carrying a NOx storage-reduction catalyst (an NSR catalyst). The NSR catalyst stores nitrogen oxides (NOx) in the exhaust gas under an oxidizing atmosphere while releasing stored NOx for reduction and purification under a reducing atmosphere. While the internal combustion engine burns fuel at a leaner air-fuel ratio than a theoretical air-fuel ratio, NOx in the exhaust gas is stored in the catalytic device in such an exhaust gas control apparatus. Then, when the air-fuel ratio of air-fuel mixture burned in the internal combustion engine temporarily turns to the rich air-fuel ratio, the catalytic device reduces and purifies stored NOx. In this way, NOx emissions to the ambient air are suppressed.

In addition to NOx, the catalytic device of the NOx storage-reduction type as described above stores sulfur oxides (SOx) in the exhaust gas in a form of sulfur compounds such as sulfate. Then, depending on deposition of the sulfur compounds, NOx storage capacity of the catalytic device is decreased, that is, so-called sulfur poisoning occurs. As a result, the exhaust gas control apparatus as described above has to execute poisoning recovery control so as to eliminate the sulfur compounds deposited on the catalytic device. In the poisoning recovery control, elimination processing is executed by increasing a temperature of the catalytic device to a temperature required to eliminate the sulfur compounds (for example, 600° C.) and thereafter supplying a reducing agent that is required for an elimination reaction of the sulfur compounds to the catalytic device.

Conventionally, an exhaust gas control apparatus for an internal combustion engine disclosed in International Publication No. 2010/116535 executes sulfur poisoning recovery control by executing the above elimination processing for a period required for recovery from sulfur poisoning when a deposition amount of the sulfur compounds on the catalytic device exceeds a prescribed value. Note that the exhaust gas control apparatus in the same literature calculates an elimination rate of the sulfur compounds from the catalytic device during the elimination processing and terminates the poisoning recovery control before a lapse of the required period in the case where the elimination rate falls below a prescribed lower limit elimination rate.

SUMMARY

An elimination amount of the sulfur compounds from the catalytic device during the elimination processing can be estimated from a supply amount of the reducing agent. Then, termination timing of the poisoning recovery control is set on the basis of the estimated elimination amount. In this way, the poisoning recovery control can be executed without excess or deficiency until the deposition amount of the sulfur compounds on the catalytic device is sufficiently decreased.

Meanwhile, a NOx storage-reduction type catalytic device with an oxygen storage function that carries an oxygen storage agent and the NOx storage-reduction catalyst has been known. The oxygen storage agent stores peripheral oxygen under the oxidizing atmosphere and releases stored oxygen under the reducing atmosphere. An oxygen release reaction of the oxygen storage agent is more intense than the sulfur oxide elimination reaction of the NOx storage-reduction catalyst. Accordingly, in the case where the exhaust gas control apparatus that includes this type of the catalytic device starts the elimination processing in a state where the catalytic device stores oxygen, the reducing agent is used for the oxygen release reaction until an oxygen storage amount of the catalytic device is decreased to a certain amount or smaller. For this reason, timing at which sulfur compounds start being eliminated is unclear, and the elimination amount of the sulfur compounds during the elimination processing cannot accurately be estimated from the supply amount of the reducing agent. Thus, in the case where the termination timing of the poisoning recovery control is decided from an estimation result of the elimination amount of the sulfur compounds during the elimination processing, the estimation result of the elimination amount deviates from an actual condition, which possibly inhibits the termination of the poisoning recovery control at appropriate timing.

The disclosure provides an exhaust gas control apparatus for an internal combustion engine capable of executing poisoning recovery control for an appropriate period, the poisoning recovery control being executed to recover a catalytic device that carries a NOx storage-reduction catalyst and an oxygen storage agent from sulfur poisoning.

An exhaust gas control apparatus for an internal combustion engine includes a catalytic device in an exhaust passage, the catalytic device carrying: a NOx storage-reduction catalyst that stores peripheral nitrogen oxides under an oxidizing atmosphere and releases stored nitrogen oxides for reduction and purification under a reducing atmosphere; and an oxygen storage agent that stores peripheral oxygen under the oxidizing atmosphere and releases stored oxygen under the reducing atmosphere. In addition, the exhaust gas control apparatus includes a poisoning recovery control section that executes poisoning recovery control to eliminate sulfur compounds deposited on the catalytic device through temperature-increase processing and elimination processing, the temperature-increase processing being processing to increase a temperature of the catalytic device to a temperature at which the sulfur compounds deposited on the catalytic device can be eliminated, and the elimination processing being processing to supply a reducing agent to the catalytic device in a state where the temperature of the catalytic device is the temperature at which the sulfur compounds can be eliminated.

In such an exhaust gas control apparatus for the internal combustion engine, the sulfur compounds deposited on the catalytic device can be eliminated by sufficiently increasing the temperature of the catalytic device, supplying the reducing agent to the catalytic device, and thereby bringing inside of the catalytic device under the reducing atmosphere. However, in the case where the catalytic device, which carries the NOx storage-reduction catalyst and the oxygen storage agent, is in a state of storing oxygen at a start of the elimination processing, the reducing agent supplied thereto is used for an oxygen release reaction until an amount of oxygen stored in the catalytic device falls below a certain amount. Accordingly, an elimination reaction of the sulfur compounds hardly occurs.

To handle the above, the exhaust gas control apparatus for the internal combustion engine includes: a pre-catalyst air-fuel ratio sensor that detects an air-fuel ratio of exhaust gas at a time when the exhaust gas flows into the catalytic device; an oxygen storage amount estimation section that estimates an oxygen storage amount on the basis of a detection value from the pre-catalyst air-fuel ratio sensor, the oxygen storage amount being the amount of oxygen stored in the catalytic device; and a determination section that determines timing at which an estimation value of the oxygen storage amount becomes equal to or smaller than a prescribed elimination start determination value after the start of the elimination processing as elimination start timing at which elimination of the sulfur compounds deposited on the catalytic device is started. The oxygen storage agent stores oxygen in the exhaust gas when the air-fuel ratio of the exhaust gas that flows into the catalytic device is lean and the inside of the catalytic device is under the oxidizing atmosphere. In addition, the oxygen storage agent releases stored oxygen when the air-fuel ratio of the exhaust gas that flows into the catalytic device is rich and the inside of the catalytic device is under the reducing atmosphere. Accordingly, the oxygen storage amount of the catalytic device can be estimated from a detection result of the pre-catalyst air-fuel ratio sensor that detects the air-fuel ratio of the exhaust gas at the time when the exhaust gas flows into the catalytic device. In addition, timing at which the elimination of the sulfur compounds deposited on the catalytic device is started (the elimination start timing) after the start of the elimination processing can be determined from the estimation value of the oxygen storage amount.

The exhaust gas control apparatus for the internal combustion engine includes a termination timing decision section that decides termination timing of the poisoning recovery control on the basis of an amount of the reducing agent supplied to the catalytic device in an elimination period that is a period after the elimination start timing during the elimination processing. The poisoning recovery control section terminates supply of the reducing agent for the elimination of the sulfur compounds and completes the poisoning recovery control at the termination timing, which is decided by such a termination timing decision section. An elimination amount of the sulfur compounds from the catalytic device in the elimination period (a sulfur elimination amount) can be estimated from the supply amount of the reducing agent to the catalytic device. Thus, according to the above configuration, the termination timing of the poisoning recovery control can be set by appropriately grasping the sulfur elimination amount during the poisoning recovery control. Therefore, according to the exhaust gas control apparatus for the internal combustion engine, the poisoning recovery control for recovering the catalytic device, which carries the NOx storage-reduction catalyst and the oxygen storage agent, from sulfur poisoning can be executed for an appropriate period.

Note that the exhaust gas flowing into the catalytic device during the elimination processing contains the reducing agent that is supplied to the catalytic device, and the air-fuel ratio of the exhaust gas is rich. In addition, while oxygen is continuously released after the start of the elimination processing, the air-fuel ratio of the exhaust gas that flows out of the catalytic device obtains a value near a theoretical air-fuel ratio due to released oxygen. In the case where the sulfur deposition amount of the catalytic device is large even after the release of oxygen is terminated and the elimination of the sulfur compounds is started, almost all of the reducing agent, which is supplied to the catalytic device, is used for the elimination of the sulfur compounds. Thus, the air-fuel ratio of the exhaust gas that flows out of the catalytic device is not significantly changed from that before the start of the elimination. On the contrary, in the case where the sulfur deposition amount of the catalytic device is small, a significant amount of the reducing agent, which is supplied to the catalytic device, is not used for the elimination of the sulfur compounds and flows out of the catalytic device. Thus, the air-fuel ratio of the exhaust gas that flows out of the catalytic device is significantly changed before and after the start of the elimination. In other words, only in the case where the sulfur deposition amount of the catalytic device is small, the elimination start timing can be checked from a difference between the air-fuel ratio of the exhaust gas that flows into the catalytic device and the air-fuel ratio of the exhaust gas that flows out of the catalytic device (hereinafter described as an exhaust air-fuel ratio difference before and after the catalytic device).

Meanwhile, the estimation value of the oxygen storage amount as described above contains an error. Accordingly, in the case where the sulfur deposition amount of the catalytic device is smaller than a certain amount, the elimination start timing can be determined more accurately on the basis of the exhaust air-fuel ratio difference before and after the catalytic device than on the basis of the estimation value of the oxygen storage amount. In view of the above, in the exhaust gas control apparatus for the internal combustion engine, a post-catalyst air-fuel ratio sensor that detects the air-fuel ratio of the exhaust gas at a time when the exhaust gas flows out of the catalytic device is provided in said exhaust gas control apparatus, and the determination section determines the elimination start timing as in (A) and (B) described below. In this way, the elimination start timing can be determined further accurately. (A) The determination section determines timing at which the estimation value of the oxygen storage amount becomes equal to or smaller than the elimination start determination value as the elimination start timing in the case where a deposition amount of the sulfur compounds on the catalytic device at the start of the elimination processing exceeds a prescribed value. (B) The determination section determines timing at which the difference between the detection value from the pre-catalyst air-fuel ratio sensor and a detection value from the post-catalyst air-fuel ratio sensor becomes equal to or smaller than a prescribed breakthrough determination value as the elimination start timing in the case where the deposition amount of the sulfur compounds on the catalytic device at the start of the elimination processing is equal to or smaller than the prescribed value.

Note that, as the supply amount of the reducing agent to the catalytic device in the period after the elimination start timing (the elimination period) during the elimination processing is increased, the elimination amount of the sulfur compounds from the catalytic device is increased. Accordingly, the elimination amount of the sulfur compounds from the catalytic device per unit time (an elimination rate) in the elimination period can be calculated from the supply amount of the reducing agent to the catalytic device. Then, an integrated value that is obtained by integrating such an elimination rate corresponds to a total amount of the sulfur compounds that is eliminated from the catalytic device during the elimination processing. Accordingly, the termination timing of the poisoning recovery control in the exhaust gas control apparatus for the internal combustion engine can be decided as follows, for example. The poisoning recovery control section in the exhaust gas control apparatus for the internal combustion engine includes an elimination rate calculation section that calculates the elimination rate in every prescribed calculation cycle from the supply amount of the reducing agent in the calculation cycle in the elimination period. Then, the termination timing decision section decides the termination timing of the poisoning recovery control on the basis of an integrated value that is obtained by integrating a calculation value of the elimination rate in the every calculation cycle in the elimination period. In such a case, the termination timing of the poisoning recovery control is decided in accordance with the elimination amount of the sulfur compounds from the catalytic device during the poisoning recovery control. Accordingly, the poisoning recovery control can be executed for an appropriate period that corresponds to the elimination amount of the sulfur compounds from the catalytic device.

The exhaust gas control apparatus that includes the catalytic device of NOx storage-reduction type as described above is applied to the internal combustion engine in which fuel is basically burned at the leaner air-fuel ratio than the theoretical air-fuel ratio. In such a case, it is considered that the fuel is burned at the leaner air-fuel ratio than the theoretical air-fuel ratio before a start of the poisoning recovery control and that the catalytic device at a time point of starting the poisoning recovery control stores a maximum amount of oxygen. Thus, the oxygen storage amount estimation section in the exhaust gas control apparatus for the internal combustion engine is preferably configured as follows. The oxygen storage amount estimation section sets a maximum oxygen storage amount as a value of the oxygen storage amount at the start of the poisoning recovery control, the maximum oxygen storage amount being a maximum value of an amount of oxygen storable in the catalytic device at the start of the poisoning recovery control. Then, in every prescribed calculation cycle, the oxygen storage amount estimation section calculates a variation in the oxygen storage amount in the calculation cycle from the detection value from the pre-catalyst air-fuel ratio sensor and increases or decreases the value of the oxygen storage amount by the variation to estimate the oxygen storage amount. In such a case, the oxygen storage amount estimation section only has to execute the calculation processing to estimate the oxygen storage amount during the poisoning recovery control. Thus, a calculation load is decreased.

Note that, when an execution period of the elimination processing is extended, the catalytic device is possibly overheated by heat generated by a reduction reaction of the sulfur compounds. For this reason, there is a case where the poisoning recovery control section in the exhaust gas control apparatus for the internal combustion engine is configured to terminate the elimination processing once when a duration of the elimination processing reaches a prescribed time limit, and thereafter start the elimination processing again when a prescribed intermission elapses. Meanwhile, depending on an operating condition of the internal combustion engine, it possibly takes time to start eliminating the sulfur compounds after the start of the elimination processing. In such a case, the amount of the sulfur compounds that can be eliminated in the elimination processing by the time limit is decreased. Thus, in order to eliminate the sufficient amount of the sulfur compounds from the catalytic device, the elimination processing has to be repeated for plural times, and the execution period of the poisoning recovery control is thereby extended.

The extension of the execution period of the poisoning recovery control in such a case can be suppressed by configuring the poisoning recovery control section in the exhaust gas control apparatus for the internal combustion engine as follows. In the poisoning recovery control section that executes the elimination processing by setting the time limit as described above, in the case where the number of repeats of the elimination processing in the single poisoning recovery control reaches a prescribed upper limit value, the supply of the reducing agent for the elimination of the sulfur compounds is terminated to complete the poisoning recovery control even when current timing is not the termination timing that is decided by the termination timing decision section.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a time chart that shows one example of an execution aspect of sulfur poisoning control in the exhaust gas control apparatus of the embodiment.

DETAILED DESCRIPTION OF EMBODIMENTS

A detailed description will hereinafter be made on one embodiment of an exhaust gas control apparatus for an internal combustion engine with reference to FIG. 1 to FIG. 8. The exhaust gas control apparatus of this embodiment is applied to an internal combustion engine of a compression-ignition type that burns fuel injected to a cylinder by self-ignition under high compression, that is, a so-called diesel engine.

Figure 1:
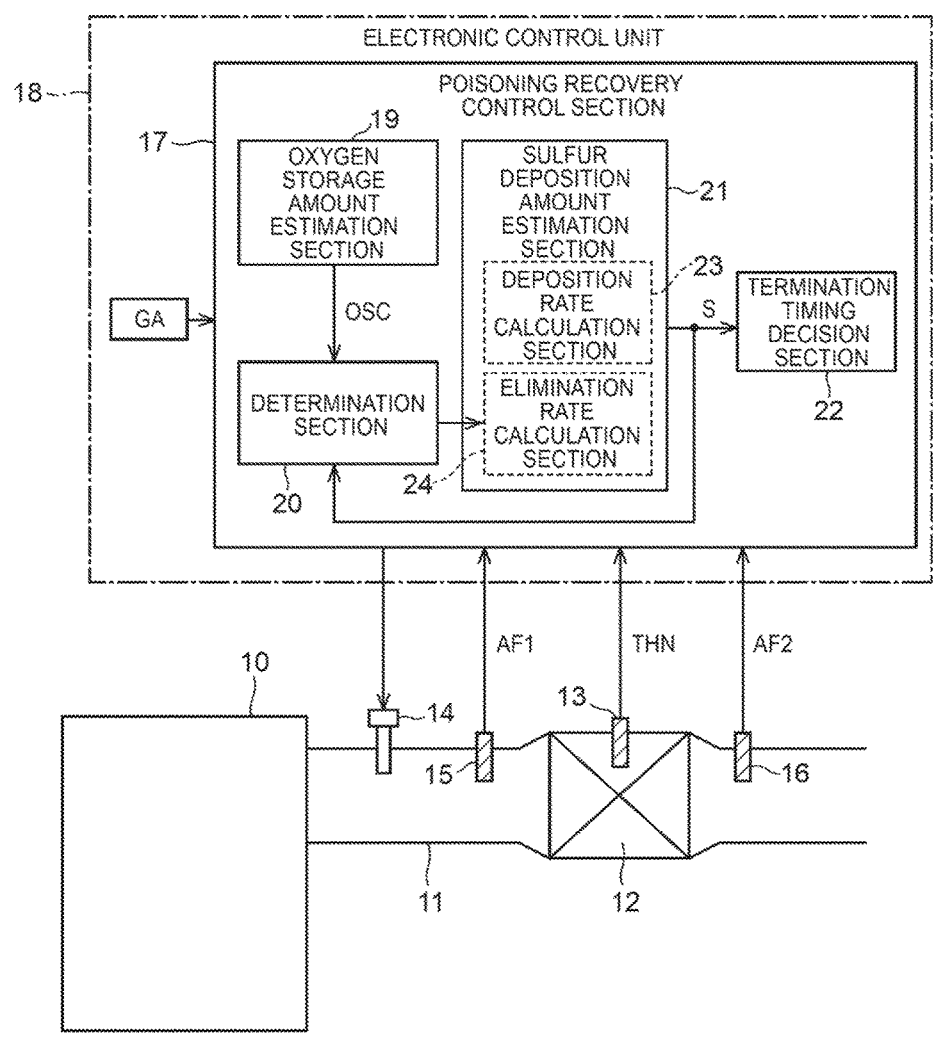
FIG. 1 is a schematic view of a configuration of one embodiment of an exhaust gas control apparatus for an internal combustion engine.

As depicted in FIG. 1, a catalytic device 12 of NOx storage-reduction type having an oxygen storage function is provided in an exhaust passage 11 of an internal combustion engine 10 to which the exhaust gas control apparatus of this embodiment is applied. The catalytic device 12 includes a carrier formed of a porous material such as alumina. The carrier of the catalytic device 12 carries a NOx storage-reduction catalyst (hereinafter described as an NSR catalyst) and an oxygen storage agent. The NSR catalyst stores peripheral nitrogen oxides under an oxidizing atmosphere and releases stored nitrogen oxides for reduction and purification under a reducing atmosphere. The oxygen storage agent stores peripheral oxygen under the oxidizing atmosphere and releases stored oxygen under the reducing atmosphere. The NSR catalyst is configured by including: a noble metal catalyst formed of noble metal (Pt, Rh, or the like); and a NOx storage agent formed of one or more of alkali metal (K, Na, Cs, or the like), an alkaline earth element (Ba, Ca, or the like), and a rare earth element (La, Y, or the like). The oxygen storage agent is configured by including cerium oxide (ceria), a composite compound including ceria (a ceria-zirconia composite compound or the like), and the like. Note that an NSR temperature sensor 13 that detects a temperature inside the catalytic device 12 (hereinafter described as an NSR temperature THN) is installed in the catalytic device 12.

A fuel adding valve 14 that adds the fuel to exhaust gas is installed in a portion of the exhaust passage 11 on an upstream side of the catalytic device 12. In addition, a pre-catalyst air-fuel ratio sensor 15 that detects an air-fuel ratio of the exhaust gas at a time when the exhaust gas flows into the catalytic device 12 (hereinafter described as a pre-catalyst exhaust air-fuel ratio AF1) is installed in a portion of the exhaust passage 11 in the vicinity of an exhaust gas inlet of the catalytic device 12. Furthermore, a post-catalyst air-fuel ratio sensor 16 that detects the air-fuel ratio of the exhaust gas at a time when the exhaust gas flows out of the catalytic device 12 (hereinafter described as a post-catalyst exhaust air-fuel ratio AF2) is installed in a portion of the exhaust passage 11 in the vicinity of an exhaust gas outlet of the catalytic device 12.

Note that, in the internal combustion engine 10, when the fuel is not added to the exhaust gas by the fuel adding valve 14, constituents of the exhaust gas that flows into the catalytic device 12 are substantially the same as constituents of the exhaust gas at a time point at which the exhaust gas is discharged from a combustion chamber of the internal combustion engine 10. The pre-catalyst air-fuel ratio sensor 15 is configured to output the same value as an air-fuel ratio of air-fuel mixture that is burned in the internal combustion engine 10 when the fuel is not added to the exhaust gas by the fuel adding valve 14. Accordingly, in the case where the air-fuel ratio of the air-fuel mixture that is burned in the internal combustion engine 10 is a theoretical air-fuel ratio (hereinafter described as a stoichiometric value ST) at the time when the fuel is not added to the exhaust gas by the fuel adding valve 14, a value of the pre-catalyst exhaust air-fuel ratio AF1 is also the stoichiometric value ST.

In the case where the value of the pre-catalyst exhaust air-fuel ratio AF1 is larger than the stoichiometric value ST, the inside of the catalytic device 12 is under the oxidizing atmosphere. Accordingly, in the catalytic device 12 at this time, the NSR catalyst stores NOx in the exhaust gas, and the oxygen storage agent stores oxygen in the exhaust gas. On the contrary, in the case where the value of the pre-catalyst exhaust air-fuel ratio AF1 is smaller than the stoichiometric value ST, the inside of the catalytic device 12 is under the reducing atmosphere. Accordingly, in the catalytic device 12 at this time, stored NOx is released and reduced, and stored oxygen is released.

Here, the post-catalyst air-fuel ratio sensor 16 has a similar configuration to the pre-catalyst air-fuel ratio sensor 15. However, because composition of the exhaust gas is changed by actions of the NSR catalyst and the oxygen storage agent in the catalytic device 12, a value of the post-catalyst exhaust air-fuel ratio AF2 does not necessarily match the value of the pre-catalyst exhaust air-fuel ratio AF1. For example, when the oxygen storage agent in the catalytic device 12 stores oxygen in the exhaust gas, the post-catalyst exhaust air-fuel ratio AF2 has a richer value than the pre-catalyst exhaust air-fuel ratio AF1. On the contrary, when the oxygen storage agent in the catalytic device 12 releases oxygen into the exhaust gas, the post-catalyst exhaust air-fuel ratio AF2 has a leaner value than the pre-catalyst exhaust air-fuel ratio AF1.

In the case where lean combustion, in which the air-fuel ratio of the air-fuel mixture has a larger value than the stoichiometric value ST, is performed in such an internal combustion engine 10, the pre-catalyst exhaust air-fuel ratio AF1 also has the larger value than the stoichiometric value ST as long as the fuel adding valve 14 does not add the fuel to the exhaust gas. Accordingly, in the catalytic device 12 at this time, NOx and oxygen in the exhaust gas are stored. Due to storage of NOx at this time, release of NOx into the ambient air is suppressed. However, an amount of NOx storable in the catalytic device 12 is limited. Accordingly, in the exhaust gas control apparatus of this embodiment, before a NOx storage amount of the catalytic device 12 reaches a maximum, a reducing agent is supplied to the catalytic device 12 by adding the fuel to the exhaust gas by the fuel adding valve 14, by rich combustion, or the like. In this way, NOx reduction processing to release stored NOx for the reduction and the purification is executed.

Meanwhile, the NSR catalyst in such a catalytic device 12 stores NOx and sulfur oxides (SOx) in the exhaust gas under the oxidizing atmosphere. SOx at this time are stored in the catalytic device 12 in a form of sulfur compounds such as sulfate. The sulfur compounds that are stored in the catalytic device 12 are not eliminated from the catalytic device 12 under a condition in the NOx reduction processing. Accordingly, the sulfur compounds are gradually deposited on the catalytic device 12, and if no measure is adopted against the deposition of the sulfur compounds, NOx storage capacity of the catalytic device 12 is decreased, that is, so-called sulfur poisoning occurs. Note that the sulfur compounds deposited on the catalytic device 12 can be eliminated from the catalytic device 12 by increasing the temperature inside the catalytic device 12 (the NSR temperature THN) to a temperature required to eliminate the sulfur compounds and thereafter bringing the inside of the catalytic device 12 under the reducing atmosphere. In the following description, a lower limit value (for example, 600° C.) of the NSR temperature THN at which the sulfur compounds deposited on the catalytic device 12 can be eliminated will be described as an elimination-enabled temperature T1.

The exhaust gas control apparatus of this embodiment includes a poisoning recovery control section 17 that executes poisoning recovery control to eliminate the sulfur compounds deposited on the catalytic device 12. The poisoning recovery control section 17 is provided in an electronic control unit 18 that controls the internal combustion engine 10, and controls the fuel adding valve 14. In addition, the poisoning recovery control section 17 receives the NSR temperature THN detected by the NSR temperature sensor 13, the pre-catalyst exhaust air-fuel ratio AF1 detected by the pre-catalyst air-fuel ratio sensor 15, and the post-catalyst exhaust air-fuel ratio AF2 detected by the post-catalyst air-fuel ratio sensor 16. Furthermore, the poisoning recovery control section 17 receives a flow rate of the exhaust gas that flows into the catalytic device 12 (hereinafter described as an exhaust gas flow rate GA). The electronic control unit 18 calculates the exhaust gas flow rate GA from an intake air amount, a fuel injection amount, and the like of the internal combustion engine 10.

The poisoning recovery control section 17 executes the poisoning recovery control through temperature-increase processing and elimination processing. The temperature-increase processing is executed to increase the NSR temperature THN to be equal to or higher than the elimination-enabled temperature T1. The elimination processing is executed to supply the reducing agent to the catalytic device 12 in a state where the NSR temperature THN is equal to or higher than the elimination-enabled temperature T1. As a control structure for the poisoning recovery control, the poisoning recovery control section 17 includes an oxygen storage amount estimation section 19, a determination section 20, a sulfur deposition amount estimation section 21, and a termination timing decision section 22.

The oxygen storage amount estimation section 19 estimates an amount of oxygen stored in the catalytic device 12 (hereinafter described as an oxygen storage amount OSC). The determination section 20 determines timing at which the sulfur compounds deposited on the catalytic device 12 start being eliminated (hereinafter described as elimination start timing) during the elimination processing. In addition, the sulfur deposition amount estimation section 21 estimates an amount of the sulfur compounds deposited on the catalytic device 12 (a sulfur deposition amount S). Furthermore, the termination timing decision section 22 decides termination timing of the poisoning recovery control. Note that the sulfur deposition amount estimation section 21 includes: a deposition rate calculation section 23 that calculates a deposition rate V1 of the sulfur compounds on the catalytic device 12; and an elimination rate calculation section 24 that calculates an elimination rate V2 of the sulfur compounds from the catalytic device 12, and calculates an estimation value of the sulfur deposition amount S from calculation results of those.

Figure 2:
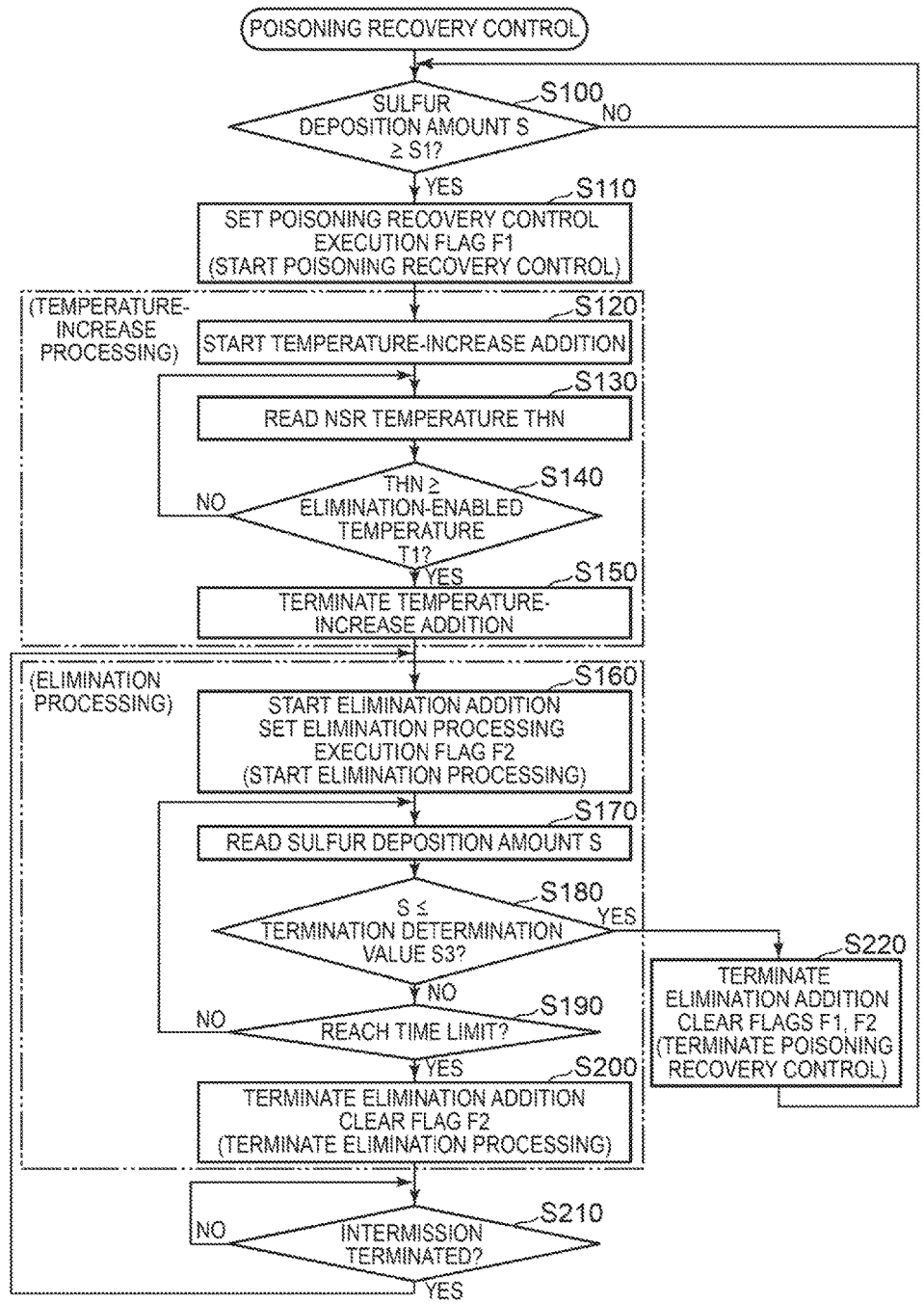
FIG. 2 is a flowchart of poisoning recovery control that is executed by a poisoning recovery control section provided in the exhaust gas control apparatus of the embodiment.

(Poisoning Recovery Control) FIG. 2 is a flowchart of a processing procedure related to the poisoning recovery control by the poisoning recovery control section 17. The poisoning recovery control section 17 starts the processing in the flowchart at a start of the internal combustion engine 10 and continues the processing until the internal combustion engine 10 is stopped.

If the sulfur deposition amount S estimated by the sulfur deposition amount estimation section 21 becomes equal to or larger than a prescribed start determination value S1 (S100: YES), the poisoning recovery control section 17 sets a poisoning recovery control execution flag F1 in step S110 and starts the poisoning recovery control. The poisoning recovery control execution flag F1 is a flag that represents whether the poisoning recovery control is currently executed. For the start determination value S1, a smaller value than a value of the sulfur deposition amount S at a time when NOx purification capacity of the exhaust gas control apparatus is decreased to a lower limit of a permissible range is set.

Once starting the poisoning recovery control, the poisoning recovery control section 17 executes the temperature-increase processing through steps S120 to S150. The temperature-increase processing is executed by execution of temperature-increase addition that is fuel addition by the fuel adding valve 14 to increase the temperature of the catalytic device 12. In the temperature-increase addition, the fuel is intermittently added to the exhaust gas. Heat generated by an oxidation reaction of the reducing agent that is supplied to the catalytic device 12 thereby causes a temperature increase of the catalytic device 12.

The specific processing procedure of such temperature-increase processing by the poisoning recovery control section 17 is as follows. By starting the temperature-increase addition in step S120, the poisoning recovery control section 17 starts the temperature-increase processing. After starting the temperature-increase processing, the poisoning recovery control section 17 reads the NSR temperature THN, which is detected by the NSR temperature sensor 13, in step S130 and determines whether the NSR temperature THN becomes equal to or higher than the elimination-enabled temperature T1 in step S140 in every prescribed control cycle. Then, if the NSR temperature THN becomes equal to or higher than the elimination-enabled temperature T1 (S140: YES), the poisoning recovery control section 17 terminates the temperature-increase addition in S150 and completes the temperature-increase processing.

Once completing the temperature-increase processing, the poisoning recovery control section 17 executes the elimination processing through step S160 to step S200. In the elimination processing, the fuel is intermittently added to the exhaust gas in sulfur compound-elimination addition at longer intervals than the temperature-increase addition. In this way, the sulfur compounds deposited on the catalytic device 12 are eliminated by a reduction reaction with the reducing agent that is supplied to the catalytic device 12. Note that, in order to avoid the catalytic device 12 from being overheated by the heat generated by the reduction reaction of the sulfur compounds at this time, a time limit is set as an upper limit of duration of the elimination processing.

The specific processing procedure of such elimination processing by the poisoning recovery control section 17 is as follows. In step S160, the poisoning recovery control section 17 starts the elimination processing by starting the elimination addition and setting an elimination processing execution flag F2. The elimination processing execution flag F2 is a flag that represents whether the elimination processing is currently executed. After starting the elimination processing, the poisoning recovery control section 17 reads the sulfur deposition amount S, which is estimated by the sulfur deposition amount estimation section 21, in step S170 and determines whether the sulfur deposition amount S becomes equal to or smaller than a prescribed termination determination value S3 in step S180 in every prescribed control cycle. Furthermore, in step S190, the poisoning recovery control section 17 determines whether the duration of the elimination processing has reached the time limit in the every control cycle. Then, the poisoning recovery control section 17 continues the elimination processing until the sulfur deposition amount S becomes equal to or smaller than the termination determination value S3 (S180: YES) or until the duration of the elimination processing reaches the time limit (S190: YES). Note that a value of the termination determination value S3 is set at "0" in this embodiment.

If the sulfur deposition amount S becomes equal to or smaller than the termination determination value S3 (S180: YES) during the elimination processing, the poisoning recovery control section 17 terminates the elimination addition and clears the poisoning recovery control execution flag F1 and the elimination processing execution flag F2 in step S220, so as to terminate the poisoning recovery control. Thereafter, the poisoning recovery control section 17 executes the poisoning recovery control of the next time if determining that the sulfur deposition amount S becomes equal to or larger than the start determination value S1 again in step S100. In this embodiment described above, the termination timing of the poisoning recovery control is decided by the determination processing in step S180 during the elimination processing.

Meanwhile, if the duration of the elimination processing has reached the time limit (S190: YES) during the elimination processing, the poisoning recovery control section 17 terminates the elimination addition and clears the elimination processing execution flag F2 in step S200, so as to terminate the elimination processing once. Then, after a prescribed intermission elapses in step S210, the processing returns to step S160, and the poisoning recovery control section 17 starts the elimination processing again. That is, in the poisoning recovery control, the elimination processing is repeatedly executed with the intermission between each two times of the elimination processing until the sulfur deposition amount S becomes equal to or smaller than the termination determination value S3. However, in order to avoid an execution period of the poisoning recovery control from being prolonged, an upper limit value is set for the number of repeats of the elimination processing in the single poisoning recovery control. Accordingly, if the number of the repeats of the elimination processing reaches the upper limit value, the poisoning recovery control is terminated even when the sulfur deposition amount S does not become equal to or smaller the termination determination value S3.

Figure 3:
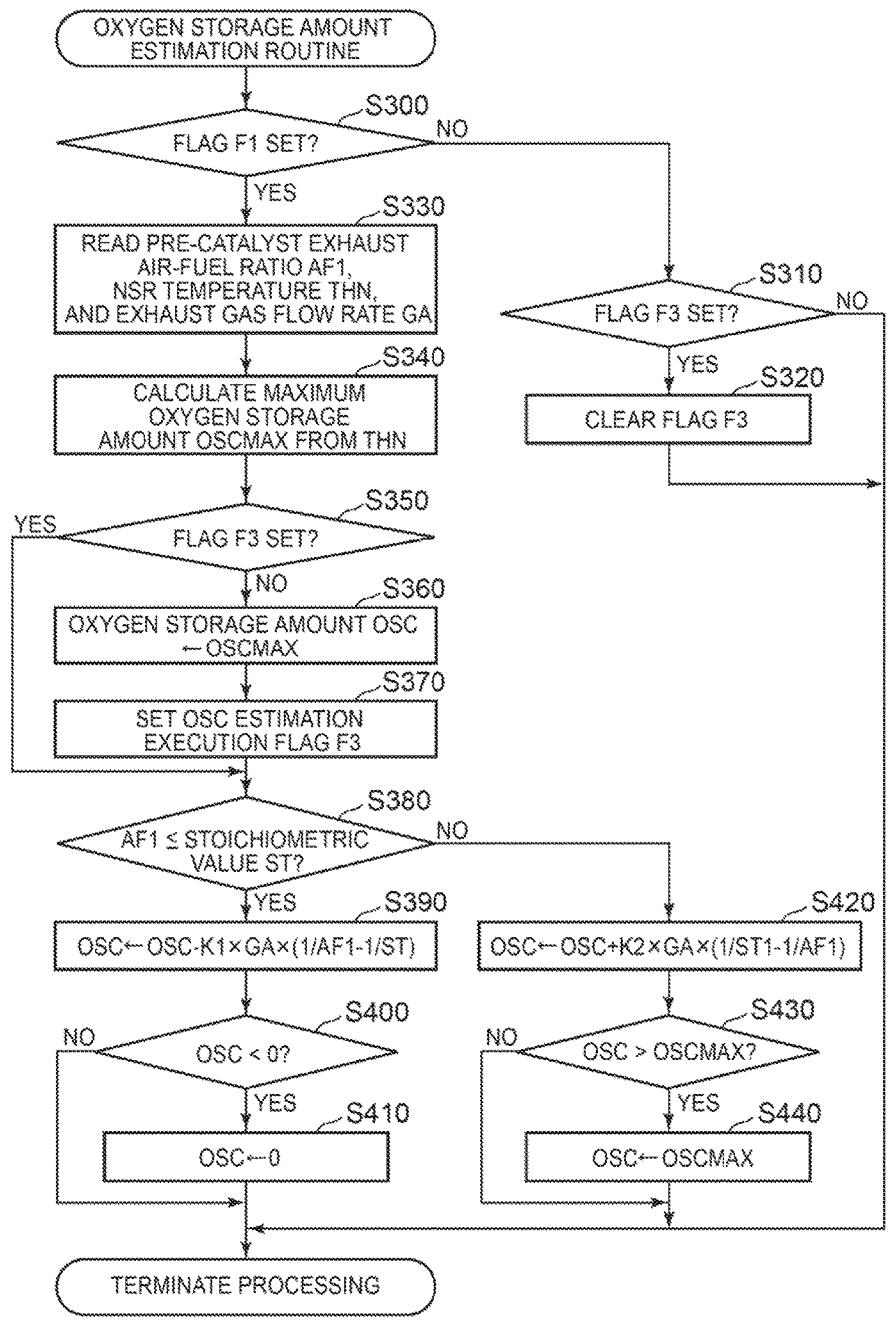
FIG. 3 is a flowchart of an oxygen storage amount estimation routine that is executed by an oxygen storage amount estimation section provided in the poisoning recovery control section.

(Estimation of Oxygen Storage Amount) Next, a detailed description will be made on estimation processing of the oxygen storage amount OSC by the oxygen storage amount estimation section 19. FIG. 3 is a flowchart of an oxygen storage amount estimation routine. During an operation of the internal combustion engine 10, the oxygen storage amount estimation section 19 repeatedly executes processing of this routine in every prescribed calculation cycle to calculate an estimation value (OSC) of the oxygen storage amount.

Once the processing of this routine is started, first in step S300, it is determined whether the above-described poisoning recovery control execution flag F1 is set, that is, whether the poisoning recovery control is currently executed. If the poisoning recovery control execution flag F1 is not set (S300: NO), it is determined whether an OSC estimation execution flag F3 is set in step S310. Then, if the OSC estimation execution flag F3 is set (YES), the OSC estimation execution flag F3 is cleared in step S320, and thereafter the processing of this current routine is terminated. On the contrary, if the OSC estimation execution flag F3 is cleared (NO), the processing of this current routine is terminated as is. Such processing in step S310 and step S320 is processing to terminate the poisoning recovery control and clear the OSC estimation execution flag F3.

Meanwhile, if the poisoning recovery control execution flag F1 is set (S300: YES), the processing proceeds to step S330. In step S330, the pre-catalyst exhaust air-fuel ratio AF1, the NSR temperature THN, and the exhaust gas flow rate GA are read. Then, in following step S340, a maximum oxygen storage amount OSCMAX that is a maximum value of an amount of oxygen storable in the catalytic device 12 in a current condition is computed from the NSR temperature THN. At this time, the maximum oxygen storage amount OSCMAX is computed by using a calculation map that stores a relationship between the NSR temperature THN and the maximum oxygen storage amount OSCMAX calculated in advance by an experiment or the like.

Next, in step S350, it is determined whether the OSC estimation execution flag F3 is set. Here, if the OSC estimation execution flag F3 is set (YES), the processing proceeds to step S380 as is. On the contrary, if the OSC estimation execution flag F3 is not set (NO), a value of the maximum oxygen storage amount OSCMAX computed in step S340 is set as a value of the oxygen storage amount OSC in step S360, and the OSC estimation execution flag F3 is set in following step S370. Thereafter, the processing proceeds to step S380.

Note that, as described above, the OSC estimation execution flag F3 is cleared when the poisoning recovery control is terminated. Accordingly, in the case where this routine is executed for the first time after the poisoning recovery control is started, the OSC estimation execution flag F3 has been cleared and is set after the processing in step S370. Thus, the processing from step S350 to step S370 is processing to set the maximum oxygen storage amount OSCMAX at the time as the value of the oxygen storage amount OSC at a start of the poisoning recovery control.

Once the processing proceeds to step S380, it is determined whether the pre-catalyst exhaust air-fuel ratio AF1 has a value that is equal to or lower than the stoichiometric value ST in step S380. If the pre-catalyst exhaust air-fuel ratio AF1 is equal to or lower than the stoichiometric value ST, that is, if the pre-catalyst exhaust air-fuel ratio AF1 has the stoichiometric value ST or a richer value than the stoichiometric value ST (S380: YES), the value of the oxygen storage amount OSC is updated in the following aspect. Then, the processing of this current routine is terminated. In this case, in step S390, the value of the oxygen storage amount OSC is updated in accordance with the following expression (1). "GA×(1/AF1−1/ST)" in the expression (1) represents a supply amount of the reducing agent to the catalytic device 12 per unit time. "K" in the expression (1) is a prescribed constant, and a value thereof is set on the basis of a relationship between the supply amount of the reducing agent and a decreased amount of the oxygen storage amount OSC that is calculated by an experiment. Note that, if the updated value of the oxygen storage amount OSC is smaller than 0 (S400: YES), the value of the oxygen storage amount OSC is set at 0 (S410).

[Expression 1]

$$OSC(\text{post-update}) \leftarrow OSC(\text{pre-update}) - K1 \times GA \times (1/AF1 - 1/ST) \qquad (1)$$

On the contrary, if the pre-catalyst exhaust air-fuel ratio AF1 has a larger value (a leaner value) than the stoichiometric value ST (S380: NO), the value of the oxygen storage amount OSC is updated in the following aspect. Then, the processing of this current routine is terminated. That is, in this case, the value of the oxygen storage amount OSC is updated in accordance with the following expression (2) in step S420. "GA×(1/ST−1/AF1)" in the expression (2) represents an oxygen supply amount to the catalytic device 12 per unit time. "K2" in the expression (2) is a prescribed constant, and a value thereof is set on the basis of a relationship between the oxygen supply amount and an increased amount of the oxygen storage amount OSC that is calculated by an experiment. Note that, if the updated value of the oxygen storage amount OSC exceeds the maximum oxygen storage amount OSCMAX (S430: YES), the value of the oxygen storage amount OSC is set to the maximum oxygen storage amount OSCMAX (S440).

[Expression 2]

$$\text{OSC(post-update)} \leftarrow \text{OSC(pre-update)} - K2 \times GA \times (1/ST - 1/AF1) \quad (2)$$

In such an oxygen storage amount estimation routine, the maximum oxygen storage amount OSCMAX of the catalytic device 12 at the start of the poisoning recovery control is set as the value of the oxygen storage amount OSC at the start thereof. Thereafter, in a period until the termination of the poisoning recovery control, a variation in the oxygen storage amount OSC in a prescribed calculation cycle is calculated from the pre-catalyst exhaust air-fuel ratio AF1 in the every calculation cycle, and the value of the oxygen storage amount OSC is increased or decreased in accordance with the variation to estimate the oxygen storage amount OSC.

In the internal combustion engine 10, to which the exhaust gas control apparatus of this embodiment is applied, the fuel is basically burned at the leaner air-fuel ratio than the theoretical air-fuel ratio (the stoichiometric value ST). Accordingly, it is considered that the catalytic device 12 at a time point of starting the poisoning recovery control stores the maximum amount of the oxygen. Thus, in the case where the oxygen storage amount OSC is estimated in the above aspect, the oxygen storage amount OSC during the poisoning recovery control can be estimated without executing calculation processing to estimate the oxygen storage amount OSC except for a time when the poisoning recovery control is executed.

(Determination of Elimination Start Timing) Next, a detailed description will be made on a determination of the elimination start timing in the elimination processing that is made by the determination section 20. An oxygen release reaction of the oxygen storage agent in the catalytic device 12 is more intense than a sulfur oxide elimination reaction of the NSR catalyst. Accordingly, in the case where the elimination processing is started in a state where the catalytic device 12 stores oxygen, the reducing agent is used for the oxygen release reaction until the oxygen storage amount OSC of the catalytic device 12 is decreased to a certain amount or smaller, and the elimination of the sulfur compounds is not started. The determination section 20 determines such timing at which the sulfur compounds start being eliminated (the elimination start timing) after the start of the elimination processing.

Figure 4:
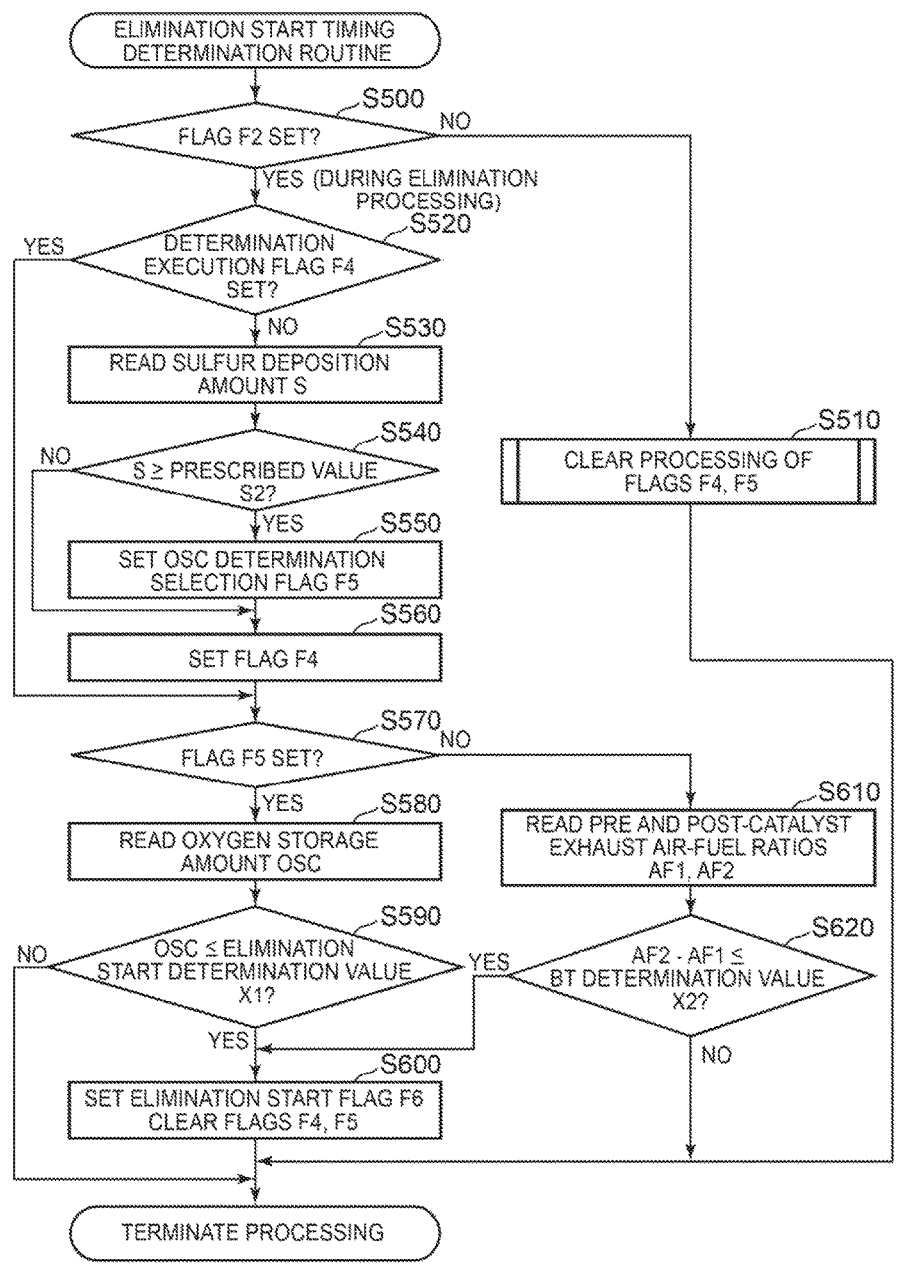
FIG. 4 is a flowchart of an elimination start timing determination routine that is executed by a determination section provided in the poisoning recovery control section.

FIG. 4 is a flowchart of an elimination start timing determination routine related to the determination of the elimination start timing. The determination section executes processing of this routine in every prescribed control cycle during the operation of the internal combustion engine 10.

Once the processing of this routine is started, first in step S500, it is determined whether the elimination processing execution flag F2 is set. Note that, as described above, the elimination processing execution flag F2 is set at the start of the elimination processing in the poisoning recovery control and is cleared at the termination of the elimination processing.

Here, the elimination processing execution flag F2 is not set (S500: NO), that is, if the elimination processing is not currently executed, in step S510, clear processing of a determination execution flag F4 and an OSC determination selection flag F5, which will be described below, is executed. Thereafter, the processing of this current routine is terminated. Note that, in the clear processing at this time, if either one of the determination execution flag F4 and the OSC determination selection flag F5 or both of the determination execution flag F4 and the OSC determination selection flag F5 are set, processing to clear the set flag(s) is executed.

On the contrary, if the elimination processing execution flag F2 is set and the elimination processing is currently executed (S500: YES), it is determined whether the determination execution flag F4 is set in step S520. If the determination execution flag F4 is set herein (YES), the processing proceeds to step S570 as is. On the contrary, if the determination execution flag F4 is not set (NO), the processing proceeds to step S530.

Once the processing proceeds to step S530, a value of the sulfur deposition amount S, which is estimated by the sulfur deposition amount estimation section 21, is read in step S530. In following step S540, it is determined whether the value of the sulfur deposition amount S is equal to or larger than a prescribed value S2. Here, if the value of the sulfur deposition amount S is equal to or larger than the prescribed value S2 (S540: YES), the OSC determination selection flag F5 is set in step S550, and the determination execution flag F4 is further set in step S560. Thereafter, the processing proceeds to step S570. On the contrary, if the value of the sulfur deposition amount S is smaller than the prescribed value S2 (S540: NO), the OSC determination selection flag F5 is not set, and the determination execution flag F4 is set in step S560. Thereafter, the processing proceeds to step S570.

Once the processing proceeds to step S570, in step S570, it is determined whether the OSC determination selection flag F5 is set. Then, the elimination start timing is determined in the following aspect in accordance with a state of the OSC determination selection flag F5.

If the OSC determination selection flag F5 is set (S570: YES), the value of the oxygen storage amount OSC, which is estimated by the oxygen storage amount estimation section 19, is read in following step S580. Then, in step S590, it is determined whether the value of the oxygen storage amount OSC is equal to or smaller than a prescribed elimination start determination value X1. If the value of the oxygen storage amount OSC is larger than the elimination start determination value X1 (S590: NO), the processing of this current routine is terminated as is. On the contrary, if the value of the oxygen storage amount OSC is equal to or smaller than the elimination start determination value X1 (S590: YES), in step S600, an elimination start flag F6 is set, and the determination execution flag F4 and the OSC determination selection flag F5 are cleared. Thereafter, the processing of this current routine is terminated. Note that the elimination start flag F6 is a flag that represents whether the sulfur compounds start being eliminated from the catalytic device 12 after the start of the elimination processing, and is set when the determination section 20 determines current timing is the elimination start timing.

On the contrary, if the OSC determination selection flag F5 is not set (S570: NO), the values of the pre-catalyst exhaust air-fuel ratio AF1 and the post-catalyst exhaust air-fuel ratio AF2 are read in step S610. Then, in following step S620, it is determined whether a difference therebetween (AF2–AF1) is equal to or smaller than a prescribed breakthrough determination value (a BT determination value) X2. If the difference between the pre and post-catalyst exhaust air-fuel ratios (AF2–AF1) exceeds the breakthrough determination value X2 (S620: NO), the processing of this current routine is terminated as is. On the contrary, if the difference between the pre and post-catalyst exhaust air-fuel ratios (AF2–AF1) is equal to or smaller than the breakthrough determination value X2 (S620: YES), in step S600 described above, the elimination start flag F6 is set, and the determination execution flag F4 and the OSC determination selection flag F5 are cleared. Thereafter, the processing of this current routine is terminated.

In the elimination start timing determination routine that has been described so far, the determination execution flag F4 is cleared when the processing of this routine is executed for the first time after the termination of the elimination processing, and is set when the processing of this routine is executed for the first time after the start of the elimination processing. Accordingly, the above processing from step S530 to step S560 is executed only when the processing of this routine is executed for the first time after the start of the elimination processing.

In addition, in the elimination start timing determination routine, if the OSC determination selection flag F5 is set, the elimination start timing is determined on the basis of the oxygen storage amount OSC. If the OSC determination selection flag F5 is not set, the elimination start timing is determined on the basis of the difference between the pre and post-catalyst exhaust air-fuel ratios. Then, whether to set the OSC determination selection flag F5 is determined by determining whether the value of the sulfur deposition amount S is equal to or larger than the prescribed value S2 in step S540. Accordingly, in the elimination start timing determination routine, when the processing of this routine is executed for the first time after the start of the elimination processing, whether to determine the elimination start timing is decided by using the oxygen storage amount OSC or the difference between the pre and post-catalyst exhaust air-fuel ratios (AF2−AF1) on the basis of the value of the sulfur deposition amount S at the time.

(Estimation of Sulfur Deposition Amount S) Next, a detailed description will be made on estimation of the sulfur deposition amount S by the sulfur deposition amount estimation section 21. As described above, the sulfur deposition amount estimation section 21 computes the sulfur deposition amount S on the basis of the calculation result of the deposition rate V1 by the deposition rate calculation section 23 and the calculation result of the elimination rate V2 by the elimination rate calculation section 24. More specifically, every time the deposition rate calculation section 23 calculates the deposition rate V1, the sulfur deposition amount estimation section 21 increases the value of the sulfur deposition amount S by a value of the deposition rate V1. In addition, every time the elimination rate calculation section 24 calculates the elimination rate V2, the sulfur deposition amount estimation section 21 decreases the value of the sulfur deposition amount S by a value of the elimination rate V2. In this way, the sulfur deposition amount estimation section 21 computes the sulfur deposition amount S.

During the operation of the internal combustion engine 10, the deposition rate calculation section 23 calculates the deposition rate V1 from an amount of SOx in the exhaust gas, the pre-catalyst exhaust air-fuel ratio AF1, the exhaust gas flow rate GA, and the NSR temperature THN in accordance with the Arrhenius equation by which a reaction rate of a chemical reaction is estimated in every prescribed calculation cycle. The deposition rate V1 represents the deposition amount of the sulfur compounds on the catalytic device 12 per unit time.

Figure 5:
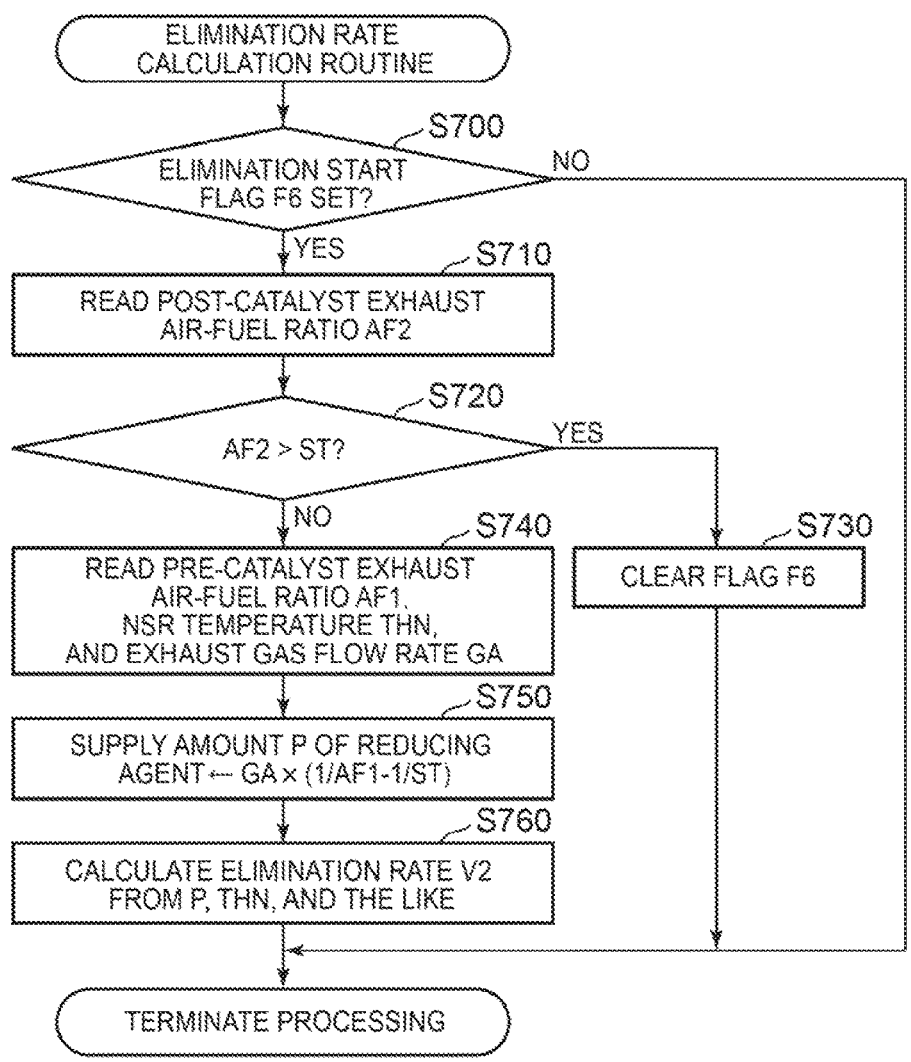
FIG. 5 is a flowchart of an elimination rate calculation routine that is executed by an elimination rate calculation section provided in a sulfur deposition amount estimation section of the poisoning recovery control section.

Meanwhile, the elimination rate calculation section 24 calculates the elimination rate V2 that is an elimination amount of the sulfur compounds from the catalytic device 12 per unit time through processing of an elimination rate calculation routine shown in FIG. 5. The elimination rate calculation section 24 executes processing of this routine in every prescribed calculation cycle during the operation of the internal combustion engine 10.

Once the processing of this routine is started, first in step S700, it is determined whether the elimination start flag F6 is set. Then, if the elimination start flag F6 is set (S700: YES), the processing proceeds to step S710. If the elimination start flag F6 is not set (S700: NO), the processing of this current routine is terminated as is.

Once the processing proceeds to step S710, the value of the post-catalyst exhaust air-fuel ratio AF2 is read in step S710. In following step S720, it is determined whether the value of the post-catalyst exhaust air-fuel ratio AF2 is larger than the stoichiometric value ST, that is, is the leaner value than the stoichiometric value ST.

Here, if the post-catalyst exhaust air-fuel ratio AF2 has the leaner value than the stoichiometric value ST (S720: YES), the elimination start flag F6 is cleared in step S730. Thereafter, the processing of this current routine is terminated. On the contrary, if the post-catalyst exhaust air-fuel ratio AF2 does not have the leaner value than the stoichiometric value ST (S720: NO), the processing proceeds to step S740.

Once the processing proceeds to step S740, the pre-catalyst exhaust air-fuel ratio AF1, the NSR temperature THN, and the exhaust gas flow rate GA are read in step S740. Then, in following step S750, a supply amount P of the reducing agent to the catalytic device 12 in the above calculation cycle is computed in accordance with the following expression (3). In following step S760, the elimination rate V2 is calculated from the supply amount P of the reducing agent and the NSR temperature THN in accordance with the Arrhenius equation. Thereafter, the processing of this current routine is terminated.

[Expression 3]

$$P \leftarrow GA \times \left(\frac{1}{AF1} - \frac{1}{ST}\right) \quad (3)$$

In the processing of such an elimination rate calculation routine, in the every prescribed calculation cycle in a period from the time point at which the determination section 20 determines that the current timing is the elimination start timing after the start of the elimination processing to a time point at which the value of the post-catalyst exhaust air-fuel ratio AF2 becomes the lean value, the elimination rate V2 is calculated on the basis of the supply amount of the reducing agent to the catalytic device 12 in the calculation cycle. The time point at which the post-catalyst exhaust air-fuel ratio AF2 becomes the lean value after the elimination start timing is a time point at which the elimination processing is terminated and the supply of the reducing agent to the catalytic device 12 is stopped. Accordingly, the elimination rate V2 is calculated in the period after the elimination start timing (hereinafter described as an elimination period) during the elimination processing. Then, an integrated value that is obtained by integrating the calculation value of the elimination rate V2 in the every calculation cycle in the elimination period represents the elimination amount of the sulfur compounds from the catalytic device 12 in the elimination period.

Meanwhile, as described above, the termination timing decision section 22 sets timing at which the value of the sulfur deposition amount S becomes equal to or smaller than the termination determination value S3 as the termination timing of the poisoning recovery control. The value of the sulfur deposition amount S, which is used for a decision on such termination timing of the poisoning recovery control, is computed by using the calculation result of the elimination rate V2 on the basis of the supply amount of the reducing agent to the catalytic device 12 in the elimination period. Accordingly, in the exhaust gas control apparatus of this embodiment, the termination timing decision section 22 decides the termination timing of the poisoning recovery control on the basis of the supply amount of the reducing agent to the catalytic device 12 in the elimination period.

(Operational Effects) Next, a description will be made on operational effects of the exhaust gas control apparatus for the internal combustion engine of this embodiment configured as described so far.

As described above, even in the case where the elimination processing is started, the sulfur compounds do not start being eliminated from the catalytic device 12, which carries the NSR catalyst and the oxygen storage agent, until the release of oxygen stored in the catalytic device 12 is terminated. Accordingly, in the cases where the elimination rate V2 is calculated throughout the execution period of the elimination processing and the calculation result is reflected to the value of the sulfur deposition amount S, the value of the sulfur deposition amount S during the poisoning recovery control possibly deviates from an actual condition thereof, which possibly inhibits the termination of the poisoning recovery control at the appropriate timing. On the contrary, in this embodiment, the elimination start timing of the sulfur compounds after the start of the elimination processing is determined, and the elimination rate V2 is calculated in the period after the elimination start timing during the elimination processing, so as to suppress the deviation of the value of the sulfur deposition amount S. In this way, the poisoning recovery control is executed in the appropriate period.

Figure 6:
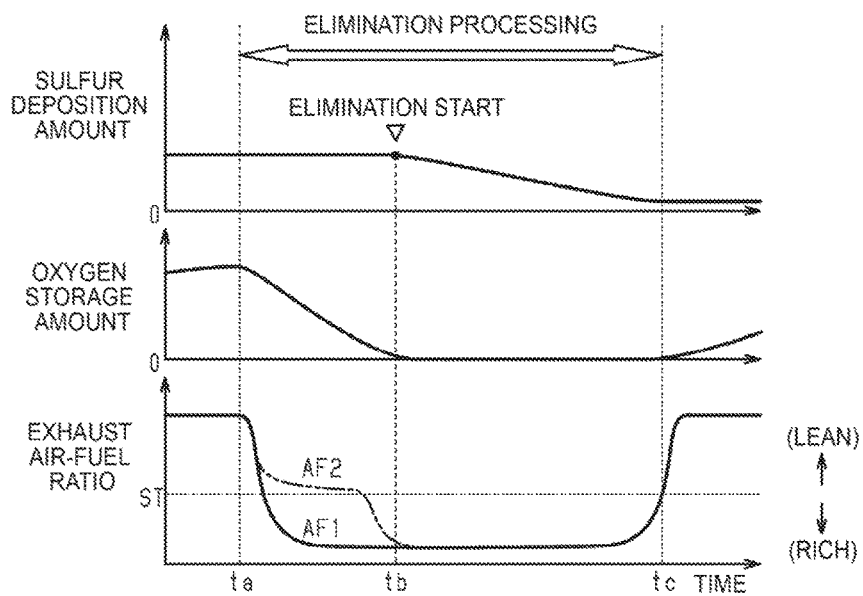
FIG. 6 is a time chart that shows transitions of a sulfur deposition amount, an oxygen storage amount, and exhaust air-fuel ratios during elimination processing in the case where the sulfur deposition amount at a start of the elimination processing is small.

FIG. 6 shows transitions of the sulfur deposition amount of the catalytic device 12, the oxygen storage amount of the catalytic device 12, the pre-catalyst exhaust air-fuel ratio AF1, and the post-catalyst exhaust air-fuel ratio AF2 during the elimination processing in a state where the sulfur deposition amount of the catalytic device 12 is small at the start of the elimination processing. Note that, in FIG. 6, the elimination processing is executed in a period from time ta to time tc.

As shown in FIG. 6, when the elimination processing is started at the time ta, due to the fuel addition to the exhaust gas by the fuel adding valve 14, the air-fuel ratio of the exhaust gas that flows into the catalytic device 12 becomes the rich air-fuel ratio at which the amount of the reducing agent is excessively large for oxygen. Then, because oxygen stored in the catalytic device 12 is released by the supplied reducing agent, the oxygen storage amount of the catalytic device 12 is decreased. While the value of the pre-catalyst exhaust air-fuel ratio AF1 at this time becomes the richer (smaller) value than the stoichiometric value ST, the post-catalyst exhaust air-fuel ratio AF2 keeps the value near the stoichiometric value ST due to oxygen released from the catalytic device 12.

Thereafter, when oxygen is released such that the oxygen storage amount of the catalytic device 12 substantially becomes zero at the time tb, the elimination of the sulfur compounds from the catalytic device 12 is started. In the case where the amount of the reducing agent that is used to eliminate the sulfur compounds at this time is smaller than the amount of the reducing agent in the exhaust gas that flows into the catalytic device 12, a surplus of the reducing agent is discharged together with the exhaust gas from the catalytic device 12. Accordingly, in the case where the sulfur deposition amount of the catalytic device 12 at the start of the elimination processing is smaller than the certain amount, the value of the post-catalyst exhaust air-fuel ratio AF2 is changed from the value near the stoichiometric value ST to the richer (smaller) value than the stoichiometric value ST at the time tb, at which the elimination of the sulfur compounds is started. Then, the pre-catalyst exhaust air-fuel ratio AF1, which obtains an offset value at the start of the elimination processing, and the post-catalyst exhaust air-fuel ratio AF2 have a substantially equal value at this time. Thus, in this case, the timing which is after the start of the elimination processing and at which the difference between the pre-catalyst exhaust air-fuel ratio AF1 and the post-catalyst exhaust air-fuel ratio AF2 is significantly decreased can be determined as the elimination start timing.

Figure 7:
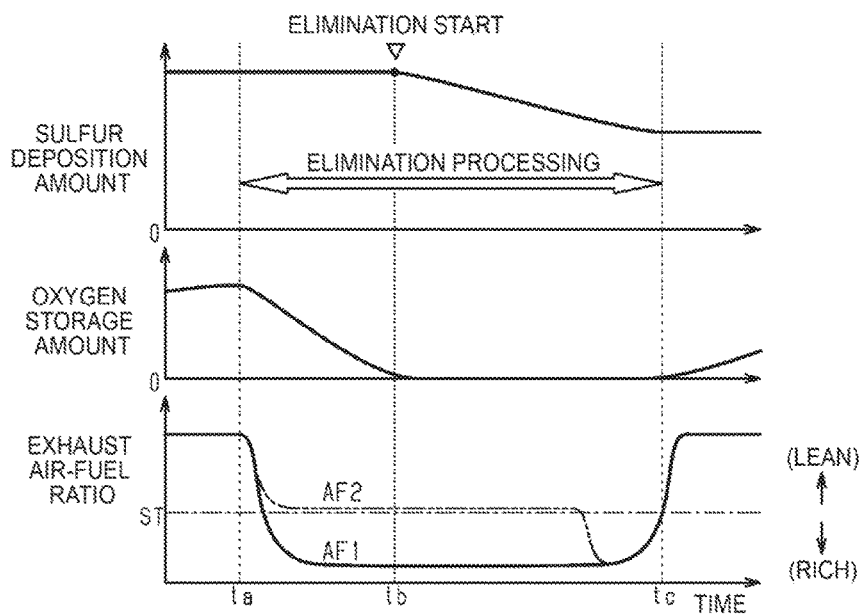
FIG. 7 is a time chart that shows the transitions of the sulfur deposition amount, the oxygen storage amount, and the exhaust air-fuel ratios during the elimination processing in the case where the sulfur deposition amount at the start of the elimination processing is large.

FIG. 7 shows the transitions of the sulfur deposition amount of the catalytic device 12, the oxygen storage amount of the catalytic device 12, the pre-catalyst exhaust air-fuel ratio AF1, and the post-catalyst exhaust air-fuel ratio AF2 during the elimination processing in a state where the sulfur deposition amount S of the catalytic device 12 is large at the start of the elimination processing. Note that, also in FIG. 7, the elimination processing is executed in the period from the time ta to the time tc. In addition, the elimination of the sulfur compounds is started at the time tb between the time ta and the time tc.

In the case where the sulfur deposition amount of the catalytic device 12 is larger than the certain amount at the start of the elimination of the sulfur compounds, the reducing agent that flows into the catalytic device 12 is almost entirely used to eliminate the sulfur compounds. Accordingly, in this case, even after the release of oxygen is terminated, the reducing agent is hardly discharged to a downstream side of the catalytic device 12. Thus, in the case where the sulfur deposition amount S of the catalytic device 12 exceeds a certain value at the start of the elimination processing, the elimination start timing cannot be determined from the difference between the pre-catalyst exhaust air-fuel ratio AF1 and the post-catalyst exhaust air-fuel ratio AF2.

On the contrary, the determination section 20 in the exhaust gas control apparatus of this embodiment determines the elimination start timing in the following aspect. In the case where the value of the sulfur deposition amount S at the start of the elimination processing is equal to or smaller than the prescribed value S2, the determination section 20 determines the timing at which the difference between the pre-catalyst exhaust air-fuel ratio AF1 and the post-catalyst exhaust air-fuel ratio AF2 (AF2−AF1) becomes equal to or smaller than the breakthrough determination value X2 as the elimination start timing. On the contrary, in the case where the value of the sulfur deposition amount S at the start of the elimination processing exceeds the prescribed value S2, the determination section 20 determines the timing at which the oxygen storage amount OSC, which is estimated by the oxygen storage amount estimation section 19, becomes equal to or smaller than the elimination start determination value X1 as the elimination start timing. Note that, for the value of the breakthrough determination value X2, the value of the difference between the pre and post-catalyst exhaust air-fuel ratios is set in a state where a significant amount of the reducing agent, which is supplied to the catalytic device 12, is not used for the reduction reaction in the catalytic device 12 but is discharged from the catalytic device 12 during the elimination processing. In addition, in this embodiment, the value of the elimination start determination value X1 is set at 0.

By the way, also in the case where the sulfur deposition amount S is small at the start of the elimination processing, the elimination start timing can be determined on the basis of the oxygen storage amount OSC. However, a certain degree of an error is contained in the value of the oxygen storage amount OSC, which is estimated by the oxygen storage amount estimation section 19. Accordingly, in the case where the sulfur deposition amount S is smaller than a certain amount at the start of the elimination processing, the elimination start timing can more accurately be determined on the basis of the difference between the pre and post-catalyst exhaust air-fuel ratios. Just as described, in this embodiment, the elimination start timing is determined in accordance with the sulfur deposition amount S at the start of the elimination processing by selecting either one of the oxygen storage amount OSC and the difference between the pre and post-catalyst exhaust air-fuel ratios that allows the more accurate determination.

FIG. 8 shows one example of an execution aspect of sulfur poisoning control in the exhaust gas control apparatus of this embodiment. When the sulfur deposition amount S reaches the start determination value S1 at time t0 in the chart, the poisoning recovery control execution flag F1 is set, and the poisoning recovery control is started. Once the poisoning recovery control is started, the temperature-increase processing is first executed through the temperature-increase addition by the fuel adding valve 14, so as to increase the NSR temperature THN to be equal to or higher than the elimination-enabled temperature T1.

When the temperature-increase processing is terminated at time t1, the elimination processing execution flag F2 is set, and the elimination processing is started. The elimination processing at this time is terminated at time t3 at which an execution duration reaches the time limit. Then, at time t4 at which the prescribed intermission elapses, the elimination processing is started again. Thereafter, the elimination processing is repeatedly executed with the intermission between each two times of the elimination processing until the poisoning recovery control is terminated. Note that, in the case of the chart, the elimination processing is executed four times before the termination of the poisoning recovery control.

Once the elimination processing is started, the reducing agent is supplied to the catalytic device 12 through the elimination addition by the fuel adding valve 14. In this way, oxygen stored in the catalytic device 12 is released. When the release of oxygen is terminated, the elimination of the sulfur compounds from the catalytic device 12 is started. Note that, during the intermission between each two times of the elimination processing, the elimination addition is paused, and the air-fuel ratio of the exhaust gas that flows into the catalytic device 12 has the leaner value than the stoichiometric value ST. Accordingly, oxygen is stored in the catalytic device 12. Thus, also at the start of the second elimination processing and onward, the catalytic device 12 is in a state of storing oxygen in the certain amount.

In the first elimination processing from the time t1 to the time t3 and the second elimination processing from the time t4 to time t6, the sulfur deposition amount S at the start of the elimination processing is equal to or larger than the prescribed value S2. Accordingly, in the first and second elimination processing, the timing at which the oxygen storage amount OSC of the catalytic device 12, which is estimated by the oxygen storage amount estimation section 19, becomes equal to or smaller than the elimination start determination value X1 is determined as the elimination start timing. Note that the elimination start timing is determined at time t2 in the first elimination processing and at time t5 in the second elimination processing.

Meanwhile, in the third elimination processing from time t7 to time t9 and the fourth elimination processing from time t10 to time t12, the sulfur deposition amount S at the start of the elimination processing is smaller than the prescribed value S2. Accordingly, in the third and fourth elimination processing, the timing at which the difference between the pre and post-catalyst exhaust air-fuel ratios (AF2−AF1) becomes equal to or smaller than the breakthrough determination value X2 is determined as the elimination start timing. Note that the elimination start timing is determined at time t8 in the third elimination processing and at time t11 in the fourth elimination processing.

Then, in the period after the elimination start timing (t2 to t3, t5 to t6, t8 to t9, t11 to t12) during each of the elimination processing, the elimination rate calculation section 24 calculates the elimination rate V2 in the every prescribed calculation cycle, and in the every calculation, the value of the sulfur deposition amount S is decreased by the value of the elimination rate V2. Then, when the value of the sulfur deposition amount S is decreased to the termination determination value S3 at the time t12 at which the fourth elimination processing is executed, the poisoning recovery control execution flag F1 is cleared, and the current poisoning recovery control is terminated.

In this embodiment described above, the elimination start timing, at which the release of oxygen from the catalytic device 12 is terminated after the start of the elimination processing and the elimination of the sulfur compounds is started, is determined on the basis of the oxygen storage amount OSC, which is estimated by the oxygen storage amount estimation section 19, or the difference between the pre and post-catalyst exhaust air-fuel ratios (AF2−AF1). Then, in the period after the elimination start timing (the elimination period) during the elimination processing, the elimination rate V2 is calculated, and the sulfur deposition amount S of the catalytic device 12 is computed in accordance with the calculation value of the elimination rate V2. The value of the sulfur deposition amount S, which is computed just as described, appropriately reflects the elimination amount of the sulfur compounds in a period in which the elimination of the sulfur compounds actually occurs. In the exhaust gas control apparatus of this embodiment, the termination timing is decided on the basis of such a value of the sulfur deposition amount S. Accordingly, the poisoning recovery control is executed for the appropriate period in accordance with the elimination amount of the sulfur compounds during the control.

Note that the above embodiment can be changed and implemented as follows. The oxygen storage amount estimation section 19 in the above embodiment estimates the oxygen storage amount OSC only during the poisoning recovery control. However, the oxygen storage amount estimation section 19 may estimate the oxygen storage amount OSC in a period other than the above.

In the above embodiment, in the elimination period, the elimination rate V2 is calculated, and the termination timing of the poisoning recovery control is determined from the sulfur deposition amount S of the catalytic device 12, which is computed in accordance with the calculation value of the elimination rate V2. Then, in accordance with this, the poisoning recovery control is executed until the sulfur deposition amount S of the catalytic device 12 obtains the prescribed value (the termination determination value S3). Alternatively, in the case where the poisoning recovery control is terminated at the time when the elimination amount of the sulfur compounds reaches the prescribed value in the poisoning recovery control, the elimination amount of the sulfur compounds may be calculated as the integrated value of the elimination rate V2 in the elimination period. Then, the poisoning recovery control may be terminated when the elimination amount of the sulfur compounds reaches the prescribed value.

In the above embodiment, in the elimination period, the elimination rate V2 is calculated in the every prescribed cycle, and the integrated value that is obtained by integrating the calculation value of the elimination rate V2 is calculated as the elimination amount of the sulfur compounds during the poisoning recovery control. Alternatively, a total amount of the reducing agent that is supplied to the catalytic device 12 in the elimination period may be used as an index value of the elimination amount of the sulfur compounds during the poisoning recovery control. Then, when the total amount of the reducing agent reaches a prescribed value, the poisoning recovery control may be terminated.

In the above embodiment, in the case where the sulfur deposition amount S of the catalytic device 12 at the start of the elimination processing exceeds the prescribed value S2, the elimination start timing is determined on the basis of the oxygen storage amount OSC. In the case where the sulfur deposition amount S is equal to or smaller than the prescribed value S2, the elimination start timing is determined on the basis of the difference between the pre and post-catalyst exhaust air-fuel ratios. Alternatively, the elimination start timing may always be determined on the basis of the oxygen storage amount OSC regardless of the sulfur deposition amount S of the catalytic device 12 at the start of the elimination processing.

In the above embodiment, the time limit is set for the execution period of the single elimination processing, and the catalytic device 12 is thereby prevented from being overheated by reaction heat generated during the elimination of the sulfur compounds. However, overheating of the catalytic device 12 by the above reaction heat may be prevented by using the NSR temperature THN during the elimination processing. In this case, when the NSR temperature THN is increased to a prescribed temperature during the elimination processing, the elimination processing is paused once, and the elimination processing is started again after the intermission for cooling. In addition, in the case where the reaction heat at the time of eliminating the sulfur compounds during the elimination processing is not high enough to cause overheating of the catalytic device 12, the elimination processing can continuously be executed until the termination of the poisoning recovery control without the intermission.

In the above embodiment, in the elimination processing, the reducing agent is supplied to the catalytic device 12 through the fuel addition to the exhaust gas by the fuel adding valve 14. Alternatively, the reducing agent may be supplied to the catalytic device 12 in the elimination processing through a method other than the above such as fuel injection after termination of combustion in the combustion chamber (post injection) or rich spike in which the air-fuel ratio of the air-fuel mixture is temporarily brought into a rich state. The embodiment of the disclosure can be defined as follows. An exhaust gas control apparatus for an internal combustion engine, the exhaust gas control apparatus includes: a catalytic device provided with a NOx storage-reduction catalyst and an oxygen storage agent and disposed in an exhaust passage, the NOx storage-reduction catalyst configured to store peripheral nitrogen oxides under an oxidizing atmosphere and to release stored nitrogen oxides for reduction and purification under a reducing atmosphere, and the oxygen storage agent configured to store peripheral oxygen under the oxidizing atmosphere and release stored oxygen under the reducing atmosphere; a first air-fuel ratio sensor configured to detect an air-fuel ratio of exhaust gas at a time when the exhaust gas flows into the catalytic device; and an electronic control unit configured to execute poisoning recovery control to eliminate sulfur compounds that are deposited on the catalytic device through temperature-increase processing and elimination processing, the temperature-increase processing being processing to increase a temperature of the catalytic device to a temperature at which the sulfur compounds deposited on the catalytic device can be eliminated, and the elimination processing being processing to supply a reducing agent to the catalytic device in a state where the temperature of the catalytic device is the temperature at which the sulfur compounds can be eliminated, estimate an oxygen storage amount based on a detection value from the first air-fuel ratio sensor, the oxygen storage amount being an amount of oxygen stored in the catalytic device, determine timing at which an estimation value of the oxygen storage amount becomes equal to or smaller than a prescribed elimination start determination value after a start of the elimination processing as elimination start timing at which elimination of the sulfur compounds deposited on the catalytic device is started, decide termination timing of the poisoning recovery control based on an amount of the reducing agent supplied to the catalytic device in an elimination period that is a period after the elimination start timing during the elimination processing, and terminate supply of the reducing agent for the elimination of the sulfur compounds and complete the poisoning recovery control at the termination timing.

What is claimed is:
1. An exhaust gas control apparatus for an internal combustion engine, comprising:
 a catalytic device disposed in an exhaust passage and provided with a NOx storage-reduction catalyst and an oxygen storage agent, the NOx storage-reduction catalyst configured to store peripheral nitrogen oxides under an oxidizing atmosphere and to release stored nitrogen oxides for reduction and purification under a reducing atmosphere, and the oxygen storage agent configured to store peripheral oxygen under the oxidizing atmosphere and release stored oxygen under the reducing atmosphere;
 a first air-fuel ratio sensor configured to detect an air-fuel ratio of exhaust gas at a time when the exhaust gas flows into the catalytic device; and
 an electronic control unit configured to
  execute poisoning recovery control to eliminate sulfur compounds deposited on the catalytic device through temperature-increase processing and elimination processing, the temperature-increase processing being processing to increase a temperature of the catalytic device to a temperature at which the sulfur compounds deposited on the catalytic device is eliminated, and the elimination processing being processing to supply a reducing agent to the catalytic device in a state where the temperature of the catalytic device is the temperature at which the sulfur compounds is eliminated,
  estimate an oxygen storage amount based on a detection value from the first air-fuel ratio sensor, the oxygen storage amount being an amount of oxygen stored in the catalytic device, determine timing at which an estimation value of the oxygen storage amount becomes equal to or smaller than a prescribed elimination start determination value after a start of the elimination processing as elimination start timing at which elimination of the sulfur compounds deposited on the catalytic device is started, decide termination timing of the poisoning recovery control based on an amount of the reducing agent supplied to the catalytic device in an elimination period that is a period after the elimination start timing during the elimination processing, and terminate supply of the reducing agent for the elimination of the sulfur compounds and complete the poisoning recovery control at the termination timing.

2. The exhaust gas control apparatus according to claim 1, further comprising a second air-fuel ratio sensor configured to detect the air-fuel ratio of the exhaust gas at a time when the exhaust gas flows out of the catalytic device, wherein the electronic control unit is configured to determine the timing at which the estimation value of the oxygen storage amount becomes equal to or smaller than the elimination start determination value as the elimination start timing in the case where a deposition amount of the sulfur compounds on the catalytic device at the start of the elimination processing exceeds a prescribed value, and determine timing at which a difference between the detection value from the first air-fuel ratio sensor and a detection value from the second air-fuel ratio sensor becomes equal to or smaller than a prescribed breakthrough determination value as the elimination start timing in the case where the deposition amount of the sulfur compounds on the catalytic device at the start of the elimination processing is equal to or smaller than the prescribed value.

3. The exhaust gas control apparatus according to claim 1, wherein the electronic control unit is configured to, in every prescribed calculation cycle in the elimination period, calculate an elimination rate from a supply amount of the reducing agent in the calculation cycle, the elimination rate being a value indicative of the elimination amount of the sulfur compounds from the catalytic device per unit time during the elimination processing, and decide the termination timing of the poisoning recovery control based on an integrated value that is obtained by integrating a calculation value of the elimination rate in the every calculation cycle in the elimination period.

4. The exhaust gas control apparatus according to claim 1, wherein the electronic control unit is configured to set a maximum oxygen storage amount that is a maximum value of an amount of oxygen storable in the catalytic device at a start of the poisoning recovery control as a value of the oxygen storage amount at the start of the poisoning recovery control, and in every prescribed calculation cycle, calculate a variation in the oxygen storage amount in the calculation cycle from the detection value from the first air-fuel ratio sensor and increase or decrease the value of the oxygen storage amount by the variation to estimate the oxygen storage amount.

5. The exhaust gas control apparatus according to claim 1, wherein the electronic control unit is configured to terminate the elimination processing once when a duration of the elimination processing reaches a prescribed time limit, and thereafter start the elimination processing again when a prescribed intermission elapses, and terminate the supply of the reducing agent for the elimination of the sulfur compounds and complete the poisoning recovery control even when current timing is not the termination timing of the poisoning recovery control, which is decided based on the supply amount of the reducing agent to the catalytic device in the case where the number of repeats of the elimination processing in the single poisoning recovery control reaches a prescribed upper limit value.

* * * * *